(No Model.)
O. B. SHALLENBERGER.
METHOD OF INDICATING ELECTRIC CURRENTS.
No. 383,667. Patented May 29, 1888.
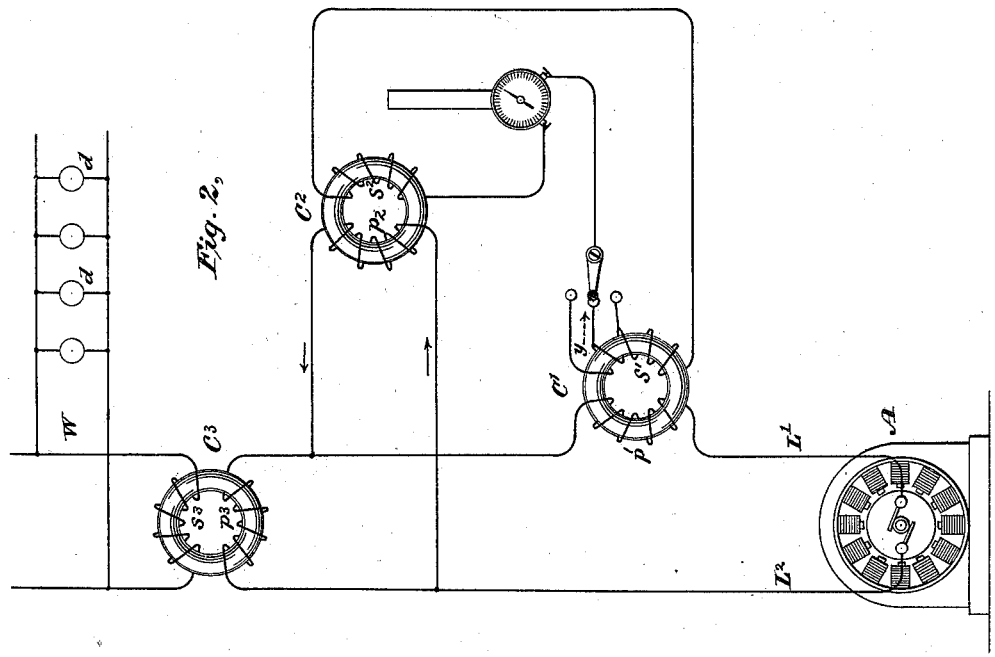
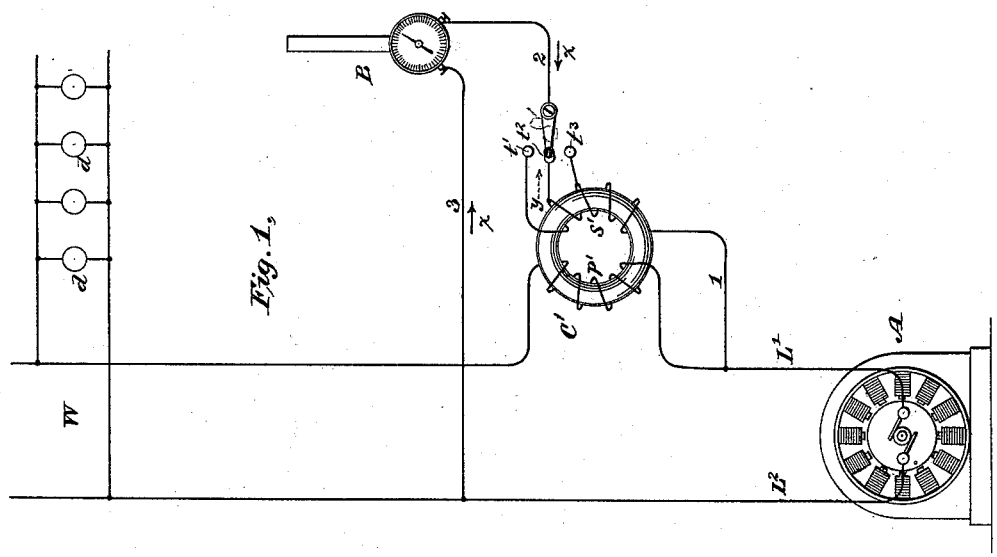
Witnesses.
Geo. W. Breck
Eugene J. Reilly
Inventor,
O. B. Shallenberger
By his Attorneys.
Pope Edgcomb & Terry.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

METHOD OF INDICATING ELECTRIC CURRENTS.

SPECIFICATION forming part of Letters Patent No. 383,667, dated May 29, 1888.

Original application filed September 1, 1887, Serial No. 248,469. Divided and this application filed December 9, 1887. Serial No. 257,409. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Methods of Indicating Electric Currents, (Case 190,) of which the following is a specification.

The invention relates to a method of indicating the current upon any given circuit; and the object is to provide convenient means for measuring and determining at the central station the difference of potential upon the work-circuit.

The invention consists in introducing into the circuit of the voltmeter an opposing electro-motive force, the amount of which is proportional to the current delivered to the work-circuit, and therefore approximately proportional to the fall of potential in transmission.

In an application, Serial No. 248,469, filed September 1, 1887, of which this case is a division, claims are made upon the apparatus for carrying out the invention.

In the accompanying drawings, Figure 1 is a diagram illustrating the general organization of the apparatus, and Fig. 2 illustrates a modification.

Referring to the figures, A represents a suitable source of alternating, undulatory, or pulsatory currents, and W a work-circuit connected therewith by conductors $L'$ and $L^2$. Translating devices $d\,d$ are connected in multiple arc in the work-circuit. The primary coil $p'$ of a converter, $C'$, is connected in series with the translating devices in the direct circuit of the conductor $L'$. The secondary coil $s'$ of the converter is connected by conductors 1 2 3 between the conductors $L'$ and $L^2$. The conductors 2 and 3 are connected with each other through a suitable indicator—such, for instance, as a Cardew voltmeter, B. The currents from the generator may be considered, for convenience, as flowing in the direction indicated by the arrows $x$. The induced current in the coil $s'$ will then be in the direction indicated by dotted arrow $y$. The value of this induced current or opposing electro motive force may be modified by means of a switch, S, capable of being placed in contact with different switch-points $t'\,t^2\,t^3$, connected with different points in the length of one of the coils, as $s'$. By suitably adjusting the relative values of the two coils the indication of the voltmeter may be modified in any required proportion to the current flowing in the conductors $L'\,L^2$, and when once adjusted to the conditions of the circuit will show the difference of potential applied to the translating devices.

In Fig. 2 the converter $C'$ has its secondary coil $s'$ connected through the secondary coil $s^2$ of a secondary converter, $C^2$, instead of being directly connected across the lines $L'$ and $L^2$. The primary coil $p^2$ of the converter $C^2$ has its terminals connected with the lines $L'$ and $L^2$, respectively. This converter $C^2$ may be constructed to reduce the potential of the current received by the coil $p^2$ in any convenient ratio in case the current upon the lines $L'$ and $L^2$ is of too great a potential to be itself conveniently employed. In this instance the lines $L'$ and $L^2$ are represented as being connected through the primary coils $p^3$ of a converter, $C^3$, while the work-circuit W is derived from the secondary coil $s^3$.

I claim as my invention—

1. The hereinbefore-described method of indicating the difference of potential upon an electric circuit, which consists in introducing in the circuit of an indicator deriving currents from the said circuit an opposing electro-motive force which is approximately proportional to the current in the work-circuit.

2. The hereinbefore-described method of indicating the difference of potential existing upon an electric circuit, which consists in introducing into an indicating-circuit traversed by electric currents an opposing electro-motive force, the amount of which is proportional to the current delivered to the work-circuit and approximately proportional to the fall of potential due to the transmission to the work-circuit.

3. The hereinbefore-described method of indicating the difference of potential at the work-circuit of a system of electric distribution, which consists in deriving a current proportional to the difference of potential at the source of currents and in opposing thereto an electro-motive force proportional to the current delivered to the work-circuit, substantially as described.

In testimony whereof I have hereunto subscribed my name this 15th day of November, A. D. 1887.

OLIVER B. SHALLENBERGER.

Witnesses:
REGINALD BELFIELD,
W. D. UPTEGRAFF.